United States Patent [19]

Röhling et al.

[11] Patent Number: 4,840,171
[45] Date of Patent: Jun. 20, 1989

[54] OXYGEN SUPPLY UNIT HAVING AN OXYGEN GENERATOR

[75] Inventors: Holmer Röhling, Reinfeld; Frank Schulz, Lübeck; Siegfried Preininger, Stockelsdorf, all of Fed. Rep. of Germany

[73] Assignee: Drägerwerk Aktiengesellschaft, Lübeck, Fed. Rep. of Germany

[21] Appl. No.: 204,873

[22] Filed: Jun. 10, 1988

[30] Foreign Application Priority Data

Jun. 11, 1987 [DE] Fed. Rep. of Germany ....... 3719427

[51] Int. Cl.⁴ ............................................. A61M 16/00
[52] U.S. Cl. ............................ 128/204.18; 128/206.27
[58] Field of Search ...................... 128/202.13, 206.27, 128/204.18; 206/803, 477; 244/118.5, 121, 122 AG

[56] References Cited

U.S. PATENT DOCUMENTS

| | | | |
|---|---|---|---|
| 1,143,488 | 6/1915 | Bell | 206/477 |
| 1,699,937 | 1/1929 | Yablick | 206/803 |
| 3,371,771 | 3/1968 | Bugyi | 206/803 |
| 3,503,394 | 3/1970 | Hotz et al. | 128/202.13 |
| 3,615,250 | 10/1971 | Vernon | |
| 3,981,302 | 9/1976 | Veit | 128/206.27 |
| 4,154,237 | 5/1979 | Courter | 128/206.27 |
| 4,481,945 | 11/1984 | Levine | 128/206.27 |

FOREIGN PATENT DOCUMENTS 828362 2/1960 United Kingdom ........... 128/206.27
2160187 12/1985 United Kingdom .

Primary Examiner—Edgar S. Burr
Assistant Examiner—Aaron J. Lewis
Attorney, Agent, or Firm—Walter Ottesen

[57] ABSTRACT

The invention relates to an oxygen supply unit equipped with an oxygen generator for supplying one or more oxygen masks. These masks and the generator are accommodated in an openable housing. The oxygen supply unit is improved in that a highest possible savings in weight is achieved while maintaining the stability of the entire arrangement so that oxygen generators can be installed which are useable for a longer duration. For this purpose, the oxygen generator is attached to a strut which is releasably connected to a reinforcing frame of the housing.

5 Claims, 3 Drawing Sheets

OXYGEN SUPPLY UNIT HAVING AN OXYGEN GENERATOR

FIELD OF THE INVENTION

The invention relates to an oxygen supply unit having an oxygen generator for supplying one or more oxygen masks.

BACKGROUND OF THE INVENTION

A supply unit of the kind described above is disclosed, for example, in U.S. Pat. No. 3,615,250. This publication discloses an oxygen generator as well as several oxygen masks which are accommodated in a housing disposed in the roof structure of the passenger compartment of an aircraft. When required, the housing can be opened by means of a flap with the oxygen generator being ignited after the oxygen masks are pulled out of the housing. The oxygen generator then delivers the needed oxygen for breathing for a predetermined time. For the known oxygen supply unit, the essential individual parts such as the oxygen generator and the oxygen masks are individually accommodated on the base wall of the housing so that the latter must have the required mechanical strength in order to withstand the loading which occurs during operation of the aircraft. Complex bracing and thickened material are provided so that the occurring forces can be taken up.

In jumbo aircraft especially, every possible savings in weight leads to a reduction of the operational cost so that the above-mentioned supporting structure should be avoided, especially because every row of seats must be assigned such an oxygen supply unit.

Larger oxygen generators are necessary especially for providing a longer needed oxygen supply so that their use makes it necessary to provide for further reinforcement of the housing accommodating the generators.

SUMMARY OF THE INVENTION

In view of the foregoing, it is an object of the invention to provide the highest possible savings in weight while at the same time maintaining the stability of the overall arrangement so that oxygen generators having a longer duration of use can be installed.

The advantages of the invention are especially seen in that a lighter supporting frame can accommodate the oxygen generator at a desired location so that the forces are transmitted to the stiff frame and are no longer transmitted to the vibration sensitive base wall of a housing shell. The supporting frame is lighter with respect to weight and satisfies the requirements of the intended use. The location at which the strut can be mounted can vary so that a suitable place can be selected therefor in accordance with the size of the generator and the number of the oxygen masks which are to be supplied. By means of a simple release of the strut with the oxygen generator, a mirror-image exchange of the arrangement of the individual parts within the reinforced frame can be made so that a common arrangement for a right configuration and a left configuration of the supply unit can be selected.

A fresh oxygen generator can be quickly exchanged for one that has been used. The loading on the housing under static weight and also during operation when dynamic forces act thereupon is very low so that the side walls of the housing and the base wall thereof can be configured as thin walls and can be produced from a light material such as plastic. A single-piece configuration is possible for which the reinforcing frame as well as the housing base wall together with its side walls can be manufactured as a single part. For this purpose, the reinforcing frame is advantageously provided with additional reinforcing elements such as flanges or reinforcing braces.

Because of the separate suspension of the oxygen generator on the reinforcing frame, the remaining housing parts such as the side walls and the housing base wall can be dimensioned to have an adequate spacing from the generator housing so that a needed heat insulation can be improved in that, for example, heat-insulating material is arranged between the housing of the oxygen generator and the side walls disposed in close proximity thereto. In most cases, an adequate circulation of air is achieved by providing suitable spacing between the oxygen generator and the walls of the housing with the air circulation being suitable for conducting the heat away. Such an improvement of the heat insulation is especially then advantageous when oxygen generators for longer periods of use are installed.

An especially advantageous form of the reinforcing frame is seen in a rectangular configuration thereof with the strut extending in a direction perpendicular to each of two side walls. In this way, an exchange of the generator with simple means is possible in that only two quick locks must be actuated on the connecting parts between the strut and the frame. If desired, the strut can also be so attached that it is pivotally connected on one side of the frame and that a threaded closure or tension closure attaches the strut at its other end.

An especially advantageous embodiment is provided wherein the strut is configured as a part of the reinforcing frame and is configured to extend along the latter. In this way, it is possible to provide oxygen generators in the form of individual candles arranged in a row as disclosed in United Kingdom Patent Application GB No. 2 160 187 A. With this arrangement, a space-saving configuration is achieved which is especially suitable when the oxygen generators are to be installed for a longer duration of use.

The masks can be attached to the housing provided with a cover thereby achieving further savings in weight. Then a housing base wall carried by the frame is no longer needed which would otherwise be required for accommodating the oxygen masks.

A holder can advantageously be provided on the strut in which the mask suspending lines of the oxygen masks are all held in common. By means of the bundling of the mask suspending lines, an ordered accommodation of all individual parts within the frame is possible, especially since the mask suspending lines are used to initiate the starter of the oxygen generator when the masks are removed from the housing. The starter of the oxygen generator is initiated when the suspending lines are torn from their holder and tensioned whereby the ignition occurs directly. Even when displacing the strut within the frame in accordance with the required arrangement, the holder of the mask suspending lines always remains in the immediate vicinity of the starter for the oxygen generator at its most advantageous mounting position.

BRIEF DESCRIPTION OF THE DRAWINGS

The invention will now be described with reference to the drawings, wherein.

DESCRIPTION OF THE PREFERRED EMBODIMENTS OF THE INVENTION

Figure 1:
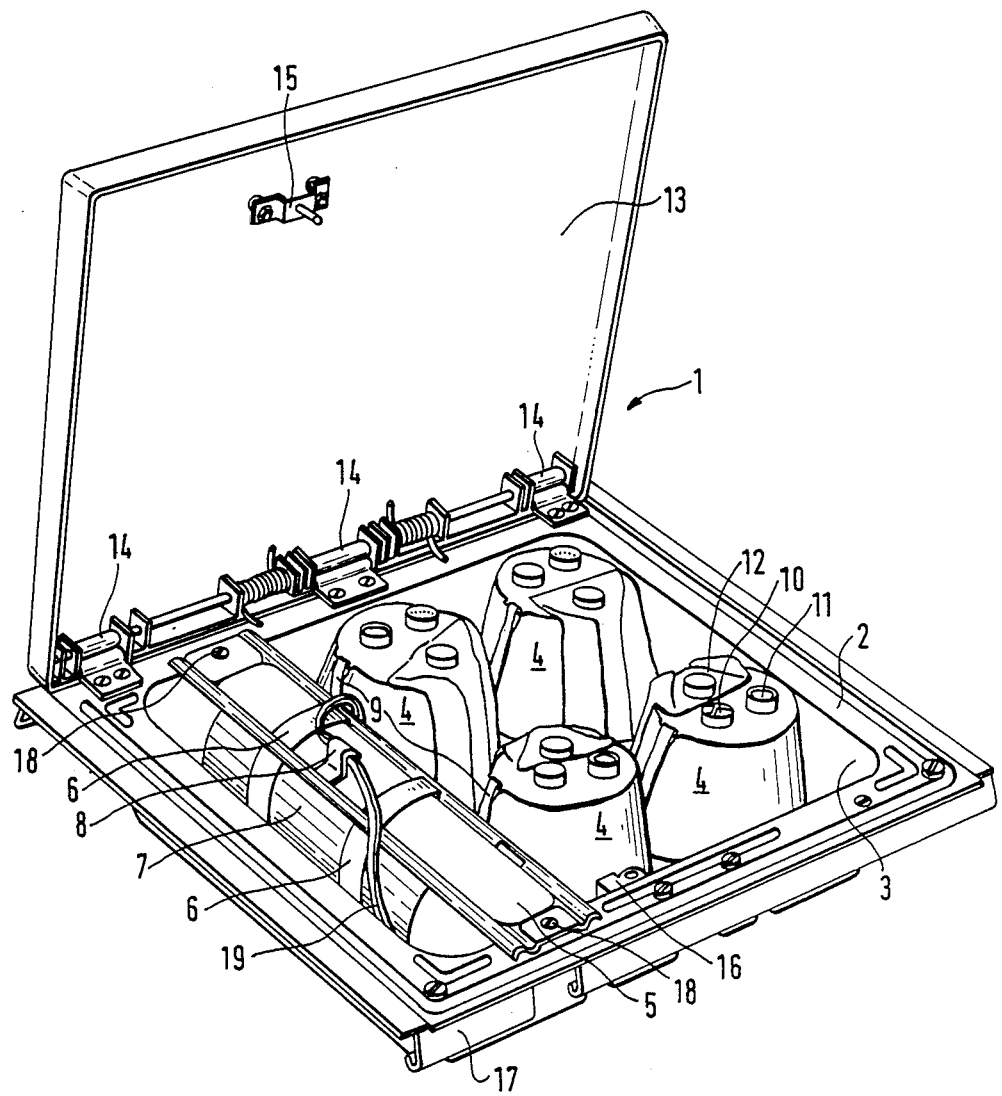
FIG. 1 is a perspective view of the oxygen supply unit according to a preferred embodiment of the invention with the cover of the housing in the opened position.

An oxygen supply unit is shown with the housing 1 thereof in the open position. The supporting structure of the housing 1 is constituted by the reinforcing frame 2 which is configured so as to be rectangular. A molded, thin-walled and light plastic half-shell 3 is attached to the frame 2 about the periphery thereof and accommodates four half-masks on its base wall. A strut 5 is attached next to the half-masks 4 so as to extend transversely across the reinforcing frame 2. The strut 5 can be attached to the reinforcing frame by releasable attachment means such as threaded fasteners 18, for example.

An oxygen generator 7 is tied to the lower side of the strut facing toward the base wall of the half-shell 3 by means of two holding bands 6. A holder 8 is mounted on the upper side of the strut 5 wherein the bundled mask suspension lines 19 are received. The half-masks 4 have their own inhale valve 10 and their own exhale valve 11 as well as a breathing bag 12 which is connected to the oxygen generator 7 with a connecting line not shown in the drawing.

A cover 13 is pivotally connected to one of the longitudinal sides of the reinforcing frame 2 by means of hinges 14. A closure 15 snaps into a latch 16 on the reinforcing frame 2 when the cover 13 is closed. A rail system 17 is provided for installing the complete supply unit in an aircraft.

Figure 2:
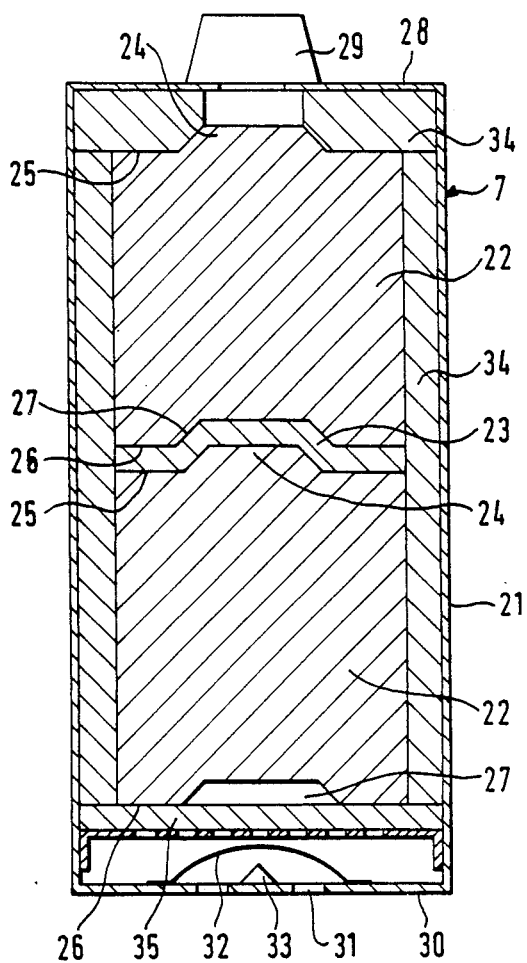
FIG. 2 is an elevation view, partially in section, of a chemical oxygen generator of the kind which can be mounted in the housing; and, FIG. 3 is a schematic of an oxygen generator having a special arrangement of its individual chlorate candles.

The oxygen generator 7 can, for example, have the configuration shown in FIG. 2. The oxygen generator here includes a sheet metal container 21 wherein individual chlorate candles 22 are housed. The chlorate candles 22 are connected via an element 23 capable of becoming red hot. The element 23 is located on an appropriate projection 24 on the upper face 25 of the individual chlorate candle 22. The lower face 26 contains an appropriate recess 27. In the cover 28 of the sheet metal container 21, the oxygen generator 7 has a known ignition device 29, not described further herein. The base 30 of the sheet metal container 21 contains an outlet opening 31 for the exit of the released oxygen. The outlet opening 31 is sealed, until the use of the oxygen-generator, by a foil 32. This is automatically opened, immediately after the start of the ignition device 29, under the excess pressure which forms, by a pin 33. A cushion 34 of a non-combustible inorganic fiber is laid around the individual chlorate candles 22. It serves for mounting the candles, and provides heat insulation at the same time. As soon as the first individual chlorate candle 22 is activated by means of the ignition device 29, the oxygen-generating reaction begins in the upper part of the generator. The reaction front creeps in the direction of the next individual chlorate candle 22. The oxygen released flows through the cushion 14 at the side of the sheet metal container 21, in the direction of the outlet opening 31.

The transmission of the reaction to the next individual chlorate candle 22 is effected via the element 23. This element is a pressed article of known material, and is ignited by the reaction heat of the first individual chlorate candle 22.

In the case of the reaction of the element 23, the gas-like and particle-like substances possibly produced are filtered out by a filter layer 35.

Figure 3:
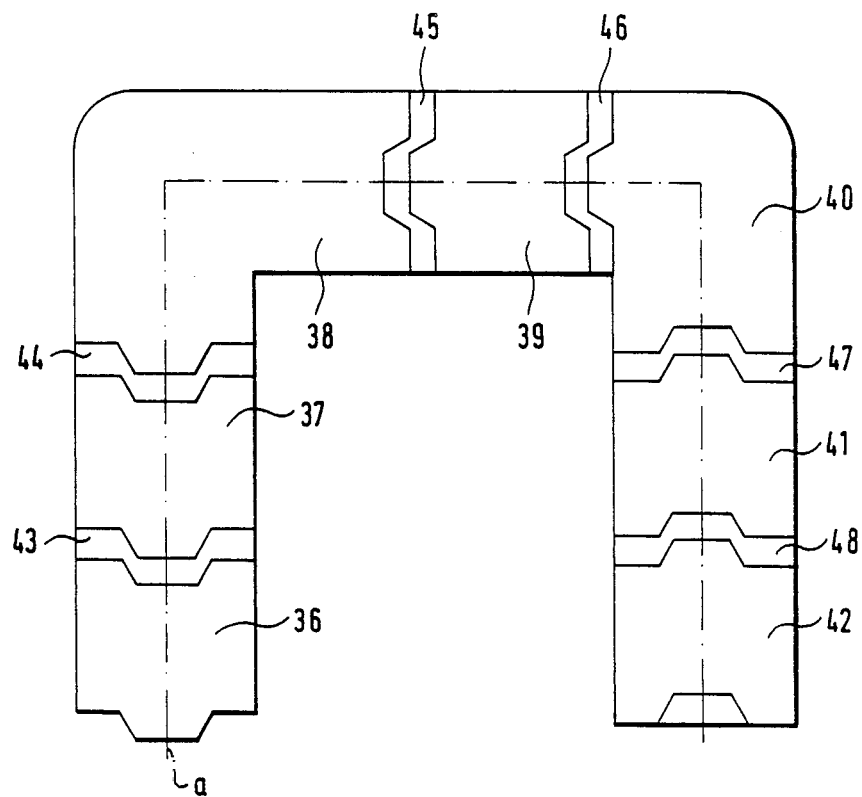

In the arrangement shown in FIG. 3, there is shown a circuitous path (a), as a flat curve, having a U-shape. The individual chlorate candles are connected in series, and plate-like elements 43 to 48 which extensively cover the faces of the individual chlorate candles, are inserted between adjacent candles. This ensures an even forward movement of the reaction front.

The individual chlorate candles 38 and 40 have a kinked axis, and act as corner pieces which are connected at each end to an individual chlorate candle having a linear axis.

The individual chlorate candles connected in series are surrounded by a corresponding gas-permeable cushion and enclosed in a container (not shown). This container has an outlet opening for the exit of the released oxygen and is provided with an ignition device for initiating the reaction.

According to another embodiment of the invention, the strut 5 can be configured so that it is a part of the reinforcing frame 2 and extends in a direction along this frame. The chlorate candles are interconnected as shown in FIGS. 2 and 3 and are arranged in a common container and follow a path extending along the reinforcing frame 2. In this way, a space-saving configuration within the half-shell 3 is achieved which is especially suitable when oxygen generators are required for a longer duration of use.

It is understood that the foregoing description is that of the preferred embodiments of the invention and that various changes and modifications may be made thereto without departing from the spirit and scope of the invention as defined in the appended claims.

What is claimed is:

1. An oxygen supply unit comprising:
   an openable housing having a rectangular reinforcing frame having four interconnected side walls;
   a strut defining a longitudinal axis and having first and second ends;
   releasable attachment means for releasably attaching said first and second ends of said strut to respective ones of two of said side walls of said reinforcing frame;
   at least one oxygen mask disposed in said housing;
   an elongated oxygen generator for supplying oxygen to said oxygen mask when said oxygen supply unit is in use;
   said oxygen generator defining a longitudinal axis; and,
   holding means for holding said generator only to said strut so as to cause said axes to extend in the same direction and so as to prevent vibration from being transmitted directly from said generator to said housing.

2. The oxygen supply unit of claim 1, said reinforcing frame having two side walls parallel to each other and said strut being attachable to said walls so as to extend in a direction perpendicular thereto.

3. The oxygen supply unit of claim 1, said housing having a lower portion attached to said reinforcing frame for accommodating said oxygen generator and said mask therein; and, said housing further including a cover connected to said lower portion for closing the latter.

4. The oxygen supply unit of claim 1, wherein a plurality of said masks are disposed in said housing and the oxygen supply unit further comprising a plurality of mask suspending lines connected to corresponding ones of said masks; and, holding means for receiving and holding all of said lines.

5. An oxygen supply unit comprising:
an openable housing having a reinforcing frame;
a strut forming a part of said frame and extending along said housing so as to define a space between said strut and said housing;
at least one oxygen mask disposed in said housing;
an oxygen generator including: a container also extending along said frame and a plurality of interconnected individual candles arranged in said container one behind the other so as to also extend along said frame; and,
holding means for holding said generator only to said strut so as to hold said generator in spaced relationship to said housing thereby preventing heat and vibration from being transferred directly from said generator to said housing.

* * * * *